United States Patent
Kikkawa et al.

(10) Patent No.: US 7,165,302 B2
(45) Date of Patent: Jan. 23, 2007

(54) SPINDLE DEVICE OF MACHINE TOOL AND METHOD OF REPLACING SPINDLE

(75) Inventors: Yasuhiko Kikkawa, Minamitsuru-gun (JP); Akihiro Mochizuki, Minamitsuru-gun (JP)

(73) Assignee: Makino Milling Machine Co., Ltd, Tokyo (JP)

( * ) Notice: Subject to any disclaimer, the term of this patent is extended or adjusted under 35 U.S.C. 154(b) by 426 days.

(21) Appl. No.: 10/470,089

(22) PCT Filed: Sep. 2, 2002

(86) PCT No.: PCT/JP02/08889

§ 371 (c)(1),
(2), (4) Date: Jul. 23, 2003

(87) PCT Pub. No.: WO03/045622

PCT Pub. Date: Jun. 5, 2003

(65) Prior Publication Data

US 2004/0074074 A1 Apr. 22, 2004

(30) Foreign Application Priority Data

Nov. 26, 2001 (JP) .............................. 2001-360027

(51) Int. Cl.
*B23B 19/02* (2006.01)
(52) U.S. Cl. .................. 29/426.1; 29/469; 29/428; 409/230; 409/231; 82/147
(58) Field of Classification Search ............. 29/402.08, 29/426.1, 428, 469; 409/144, 230, 231, 232, 409/233; 408/238, 239 R, 240, 239 A; 82/147
See application file for complete search history.

(56) References Cited

U.S. PATENT DOCUMENTS 4,167,218 A * 9/1979 Horiuchi et al. ............. 173/213

(Continued)

FOREIGN PATENT DOCUMENTS

JP 62-96120 6/1967

(Continued)

OTHER PUBLICATIONS

"Assembly Instructions IFEI Synchronous Built-In- Motors" of Siemens AG, 1999.

(Continued)

*Primary Examiner*—Eric Compton
(74) *Attorney, Agent, or Firm*—Paul & Paul

(57) ABSTRACT

A spindle device of a machine tool such as a milling machine and a machining center and a method of replacing a spindle, the spindle device wherein the housing of a spindle head (5) is divided into a front housing (23) and a rear housing (25), a spindle (7) is installed in the front housing (23) through front bearings (9), and a built-in motor rotor (43), a bearing case (33) through rear bearings (11), and a draw bar (51) for clamping a tool are installed on and in the spindle (7) to form a front housing unit (93); the method comprising the step of replacing the spindle (7) and the bearings by replacing the front housing unit (93), whereby, when the spindle device comes out of order, the spindle and bearings can be easily replaced in a short time and the stop time of the machine tool can be minimized at a site where the machine tool is used.

7 Claims, 4 Drawing Sheets

U.S. PATENT DOCUMENTS

| | | | |
|---|---|---|---|
| 4,534,686 A | | 8/1985 | Nakamura et al. |
| 4,944,638 A | * | 7/1990 | Brohammer ............... 408/59 |
| 6,095,729 A | * | 8/2000 | Pattison et al. ............ 409/230 |
| 6,761,517 B1 | * | 7/2004 | Schuettel et al. ........... 409/231 |

FOREIGN PATENT DOCUMENTS

| | | | |
|---|---|---|---|
| JP | 63-25883 | | 7/1968 |
| JP | 02-015902 | * | 1/1990 |
| JP | 3-142142 A | | 6/1991 |
| JP | 3-103102 | | 10/1991 |
| JP | 04-057608 | * | 2/1992 |
| JP | 05-200605 | | 8/1993 |
| JP | 07-112303 | * | 5/1995 |
| JP | 8-22481 | | 3/1996 |
| JP | 11-099403 | * | 4/1999 |
| JP | 2000-061705 | * | 2/2000 |

OTHER PUBLICATIONS

Pages from handbood "Mechanical Design Handbook". Kyoritu Shuppan Co., Ltd., published on Jun. 15, 1960, pp. 1-2. For relevance see the attached partial translation thereof.

* cited by examiner

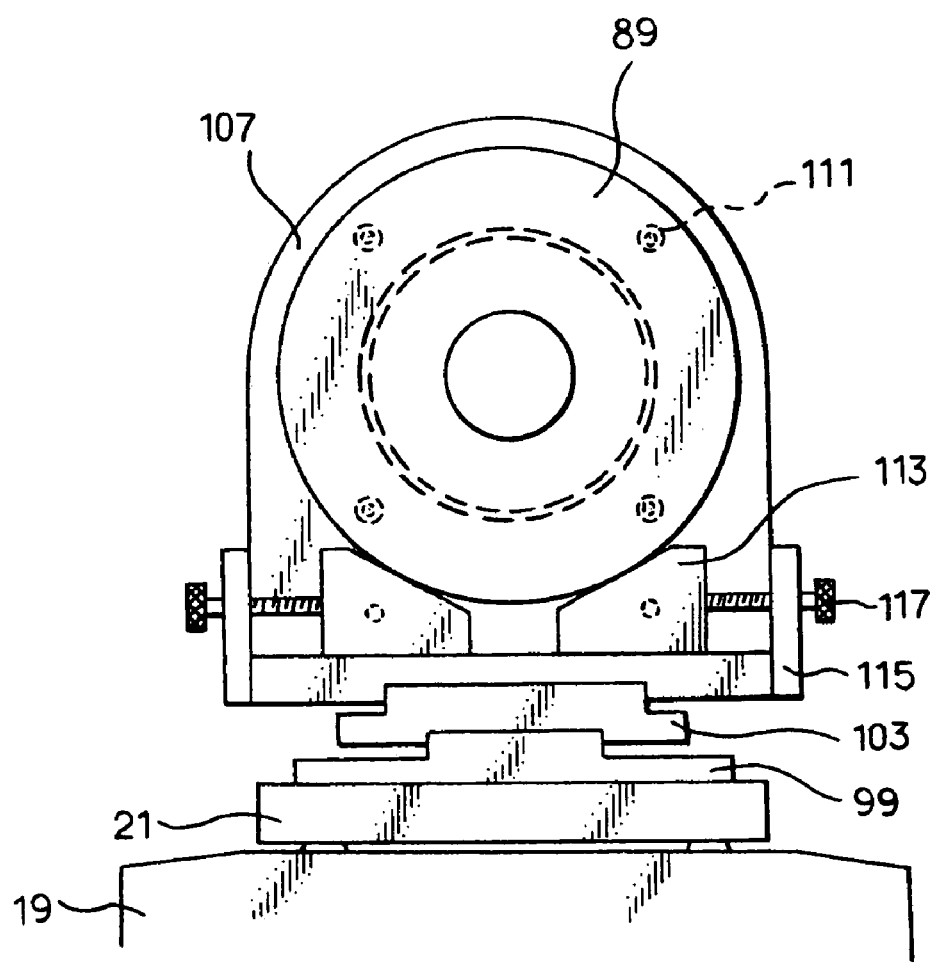

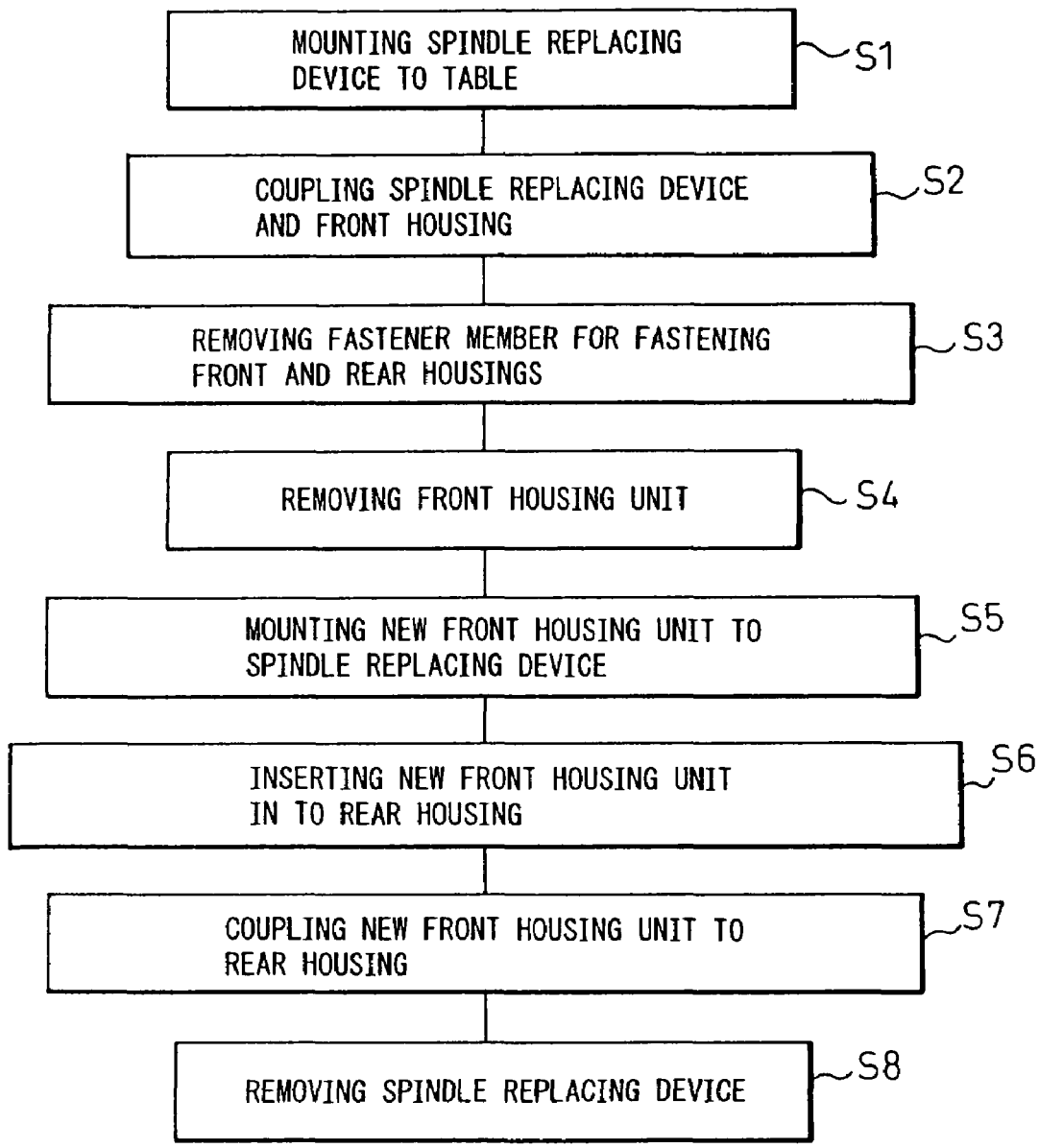

SPINDLE DEVICE OF MACHINE TOOL AND METHOD OF REPLACING SPINDLE

TECHNICAL FIELD

The invention relates to a spindle device of a machine tool, such as a vertical or a horizontal milling machine and a machining center which allows easy replacement of the spindle, and to a method of replacing a spindle of a machine tool.

BACKGROUND ART

A spindle device of a machine tool interchangeably holds a various tools, rotates at a high speed and receives a large machining load when a workpiece is machined. The machining load may result in wear of a tool fitting hole of the spindle, breakage of a collet and Belleville springs for clamping a tool and wear and tear of the bearings. In most cases, the breakdown of the spindle appears in the spindle itself, within the spindle or in the bearings.

When such breakdown or failure is fixed at the site where the machine tool is used, conduits for supplying a fluid and air pressure for the lubrication, cooling and cleaning and electric wirings to the motors and limit switches are removed. Then, the spindle device is disassembled to replace the spindle, the parts within the spindle or the bearings, thereafter the spindle device is reassembled. The repair work is extensive, requires expert knowledge and skill and involves a great deal of time.

As a first prior art, Japanese Unexamined Patent Publication (Kokai) No. 11-99403 describes a spindle device of which the spindle can be divided into front and rear spindle parts when the spindle is replaced, the bearings and a rear bearing housing are removed from the spindle. Then, the front and rear spindle parts are decoupled for the replacement of the front or rear spindle part, thereafter, the spindle device is reassembled.

As a second prior art, Japanese Unexamined Patent Publication (Kokai) No. 3-103102 describes a spindle supporting arrangement of a machine tool in which the spindle, a front bearing, a rotor of a built-in motor and a rear bearing are removed as a whole by sliding the outer surfaces of the outer races of the bearings relative to the inner surface of the housing. The spindle device is reassembled after the spindle or the bearings are replaced and assembled back outside of the housing.

As a third prior art, Japanese Unexamined Patent Publication (Kokai) No. 4-57608 describes a spindle device which includes a cartridge housing in which the spindle and bearings are incorporated in a housing. The cartridge housing can be attached to a spindle carriage to a various machine tools. Although this publication does not disclose a method of replacing the spindle at a site where the machine tool is used, it suggests a replacement of the spindle and bearings as a cartridge.

As a fourth prior art, Japanese Unexamined Patent Publication (Kokai) No. 3-142101 describes a built-in motor type headstock including a main bearing part and a motor part. The main bearing part can be commonly used and a various sizes of the motor part are interchangeably used according to the requested specification.

According to the first prior art, the spindle is divided into the two parts so that only one of the front and rear spindle parts can be economically replaced. However, the at the time of replacement, the works of disengaging a shrinkage fit at the joint between the front and rear spindle part, coupling a new spindle part by a shrinkage fit and/or coupling or decoupling the bearings or the rotor which are coupled to the spindle by an interference fit require expert knowledge and skill and a special facility and therefore, cannot be conducted at a site where the machine tool is used.

According to the second prior art, although the spindle can be replaced easier that the first prior art, the outer races of the bearings, directly affecting the rotational accuracy of the spindle, are detached from and attached to the housing. Therefore, the replacement work requires expert knowledge and skill. Further, after the replacement of the spindle, a test run is conducted to check whether or not the noise, the vibration and the heat generation are normal. Therefore, the downtime of the machine tool for the spindle replacement is relatively long.

According to the third prior art, the cost for the replacement is increased because the whole of the housing must be replaced. Further, the conduits, electric wires and covers must be detached and attached to allow the spindle replacement. Therefore, the amount of work and time for the replacement is increased.

According to the fourth prior art, the main bearing part on the headstock cannot be separated from the motor part, at the site where the machine tool is used, for the replacement of the spindle and the front and rear bearings as a whole. In particular, the rear bearings must be disassembled from the bearing case and therefore, the spindle replacement work is very difficult.

SUMMARY OF THE INVENTION

The present invention is directed to solve the above-described problems of the prior art and to provide a spindle device of a machine tool a method of replacing a spindle of a machine tool improved to enable to replace the spindle and the bearings at a site, where the machine tool is used, easily and in short time so that the downtime of the machine tool is reduced as much as possible.

In consideration of the above-described object, the invention comprises a housing including front and rear housing portions, a front bearing part, a spindle and rear bearing part which are incorporated in the front housing to define a front housing unit, the front housing unit being detachably coupled to the rear housing.

According to the invention, there is provided a spindle device of a machine tool with a spindle which is rotationally supported by a housing, comprising a spindle, a housing for enclosing a least a part of the spindle, the housing including a front housing and a rear housing which is detachably coupled to the front housing, a front bearing part, incorporated in the front housing, for rotationally supporting the front part of the spindle, a rear bearing part, incorporated in the rear housing, for rotationally supporting the rear part of the spindle, and the front bearing part, the spindle and the rear bearing part being removed as a whole from the rear housing along with the front housing when the front housing is removed from the rear housing.

According to another feature of the invention, there is provided a machine tool which machines a workpiece by relatively moving a tool and the workpiece, comprising a spindle device having a spindle which rotates and clamps a tool, a table to which the workpiece is mounted, a moving mechanism for relatively moving the spindle device and the table. The spindle device comprises a spindle, housing for enclosing a least a part of the spindle, the housing including a front housing and a rear housing which is detachably coupled to the front housing, a front bearing part, incorporated in the front housing, for rotationally supporting the front part of the spindle, a rear bearing part, incorporated in the rear housing, for rotationally supporting the rear part of the spindle, and the front bearing part, the spindle and the rear bearing part being removed as a whole from the rear housing along with the front housing when the front housing is removed from the rear housing.

Further, there is provided a method of replacing a spindle of a machine tool which comprises a spindle device having a spindle, a housing for enclosing a least a part of the spindle, the housing including a front housing and a rear housing which is detachably coupled to the front housing, a front bearing part, incorporated in the front housing, for rotationally supporting the front part of the spindle and a rear bearing part, incorporated in the rear housing, for rotationally supporting the rear part of the spindle. The method comprises the steps of mounting a spindle replacing device to a table of the machine tool, coupling the spindle replacing device and the front housing, removing a fastener member for fastening the front housing to the rear housing, moving the front housing away from the rear housing in the axial direction of the spindle to remove the front bearing part, the spindle and the rear bearing part, which are incorporated in the front housing, as a front housing unit from the rear housing, replacing the removed front housing unit with a new front housing unit, inserting the new front housing unit into the rear housing, coupling the new front housing and rear housing to each other by a fastener member, and removing the spindle replacing device from the front housing.

The inventors have found that most of the failures of the spindle of machine tools are concentrated in the spindle and the bearings, and provide a front housing unit, which includes a spindle, a front bearing part for rotationally supporting the front part of the spindle and a rear bearing part for rotationally supporting the rear part of the spindle which are incorporated in a front housing so that the front housing unit can be decoupled from a rear housing. By preparing a previously conditioned new front housing unit at a site where the machine tool is used, the replacement work can be conducted in a short time by inserting the new front housing unit into the rear housing and coupling them by fastener members. Therefore, according to the invention, the spindle can be replaced in a short time at the site where the machine tool is used when the spindle device breaks down. Therefore, the downtime of the machine tool is reduced and the operating rate is increased.

Further, no expert knowledge and skill is required for the spindle replacement work, and covers, wires and/or conduits are not substantially required to be removed.

BRIEF DESCRIPTION OF THE DRAWINGS

A preferred embodiment of the invention will be described below with reference to the accompanied drawings, in which:

FIG. 3 is section along line III—III in FIG. 3; and

FIG. 4 is a flowchart showing the steps of a spindle chaining method of the invention.

BEST MODE FOR CARRYING OUT THE INVENTION

Figure 1:
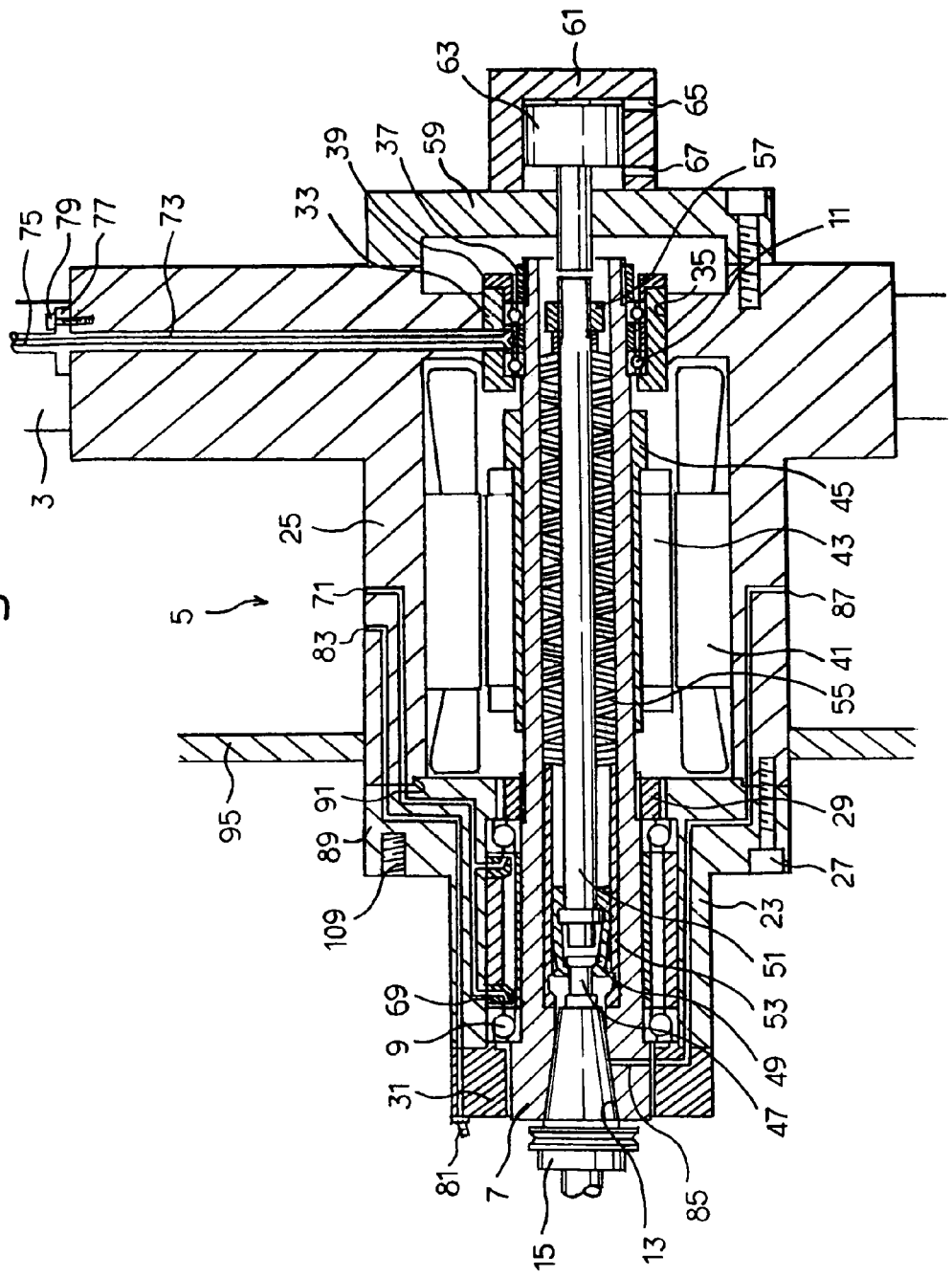
FIG. 1 is a section of a spindle device of a machine tool of the invention.
Figure 2:
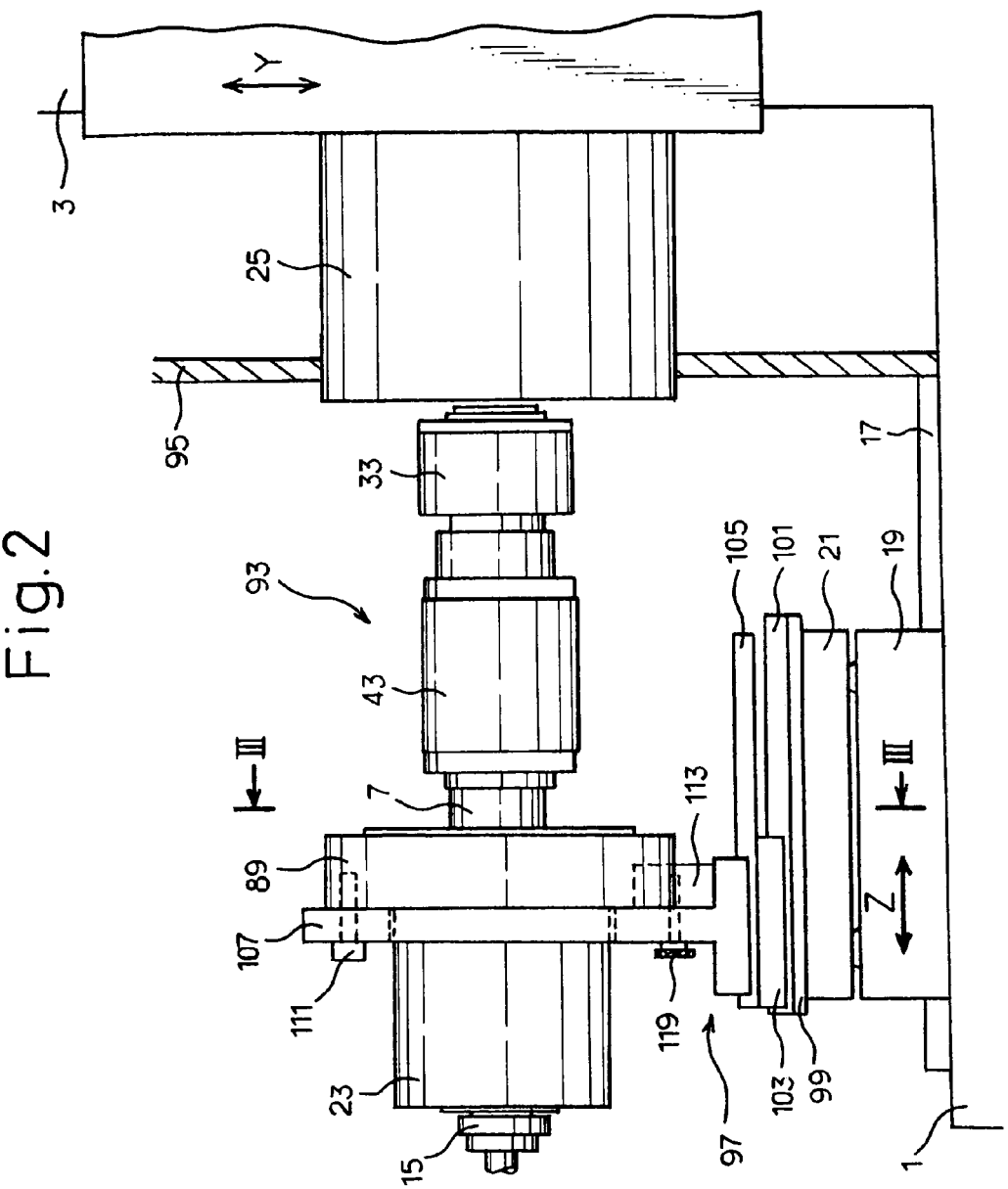
FIG. 2 is a side view of a machine tool provided with the spindle device of the invention in which a front housing unit is removed.

A preferred embodiment of the invention will be described with a horizontal machining center as an example. A spindle head 5 vertically moves along Y-axis guide rails 3 of a column (not shown) which is secured to a bed 1. A spindle motor 7 is rotationally supported within the spindle head 5 by front and rear bearings 9 and 11, and is rotationally driven by a built-in motor. A tool holder 15 is interchangeably fitting in a tapered bore 13 provided at the end of the spindle 7. A various tools (not shown) are mounted to the holder. On the other hand, Z-axis guide rails 17 are mounted to the bed 1 along which a table moves in back-and-forth directions. A pallet 21 is detachably mounted to the table 19. The pallet is changed by a pallet changer (not shown). A workpiece (not shown) is typically mounted to the pallet 21. The workpiece is moved relative to the tool attached to the rotating spindle 7 for machining the workpiece. A telescopic cover 95 moves along with the spindle head 5 in Y-axis direction and prevents the chips and coolant from entering the inside of the Y-axis guiding mechanism including Y-axis guide rails 3.

The housing of the spindle head 5 is composed of a front housing 23 and a rear housing 25 which are integrally connected by bolts 27. Inside the front housing 23, the two front bearings 9 are provided for rotationally supporting the front part of the spindle 7. The inner race of one of the front bearings 9, shown at the left in the drawings, abuts a shoulder defined by the spindle 7. The inner race of the other of the front bearings 9, shown at the right in the drawing, is secured to the spindle 7 by a nut 29 with an inner race collar clamped between the front bearings. The outer race of the right front bearing 9 abuts a shoulder defined by the front housing 23. The outer race of the left front bearing 9 is fixed by a bearing retainer 31 with an outer race collar clamped between the front bearings.

A bearing case 33 is fitted in a hold 35 defined in the rear housing 25. The two rear bearings 11, for rotationally supporting the rear part of the spindle 7, are provided inside the bearing case 33. The inner race of one of the rear bearings 11, shown at the left in the drawings, abuts a shoulder defined by the spindle 7. The inner race of the other of the rear bearings 11, shown at the right in the drawing, is secured to the spindle 7 by a nut 37 with an inner race collar clamped between the rear bearings. The outer race of the left rear bearing 11 abuts a shoulder defined by the bearing case 33. The outer race of the right rear bearing 11 is fixed by a bearing retainer 39 with an outer race collar clamped between the rear bearings.

A stator 41 of the built-in motor is provided inside of the rear housing 25. A rotor 43 is provided onto the spindle 7 with a small radial gap provided relative to the stator. The rotor 43 is secured to a sleeve 45 by shrinkage fit. The sleeve 45 is also secured to the spindle by shrinkage fit.

The tool holder 15 is fitted into the tapered hole 13 provided in the end portion of the spindle 7. A pull stud 47 is provided at the rear end of the tool holder, and is clamped by a collet chuck 49. The collet chuck 49 is advanced and retracted in the axial direction by a draw bar 51. A sleeve 53 and a plurality of Belleville springs 55 are disposed along the inner surface of the spindle 7. The right end Belleville spring 55 is held by a nut 51 crewed to the rear end of the draw bar 51 with a collar clamped therebetween. The Belleville springs 55 apply a resilient biasing force to the draw bar 51 in the reward direction so that the toll holder 15 is clamped by the collet chuck 49 with the tapered shank of the tool holder intimately contacting with the tapered hole 13 of the spindle 7.

A rear cover 59 is mounted to a rear part of the rear housing 25. A cylinder 61 is formed at the rear end of the rear cover. A piston 63 is disposed in the cylinder 61. The piston is moved by a fluid pressure to forwardly force the draw bar 51, which is rewardly biased by the Belleville springs 55, to unclamp the tool holder 15. By supplying the fluid pressure through a fluid pressure supply port 65 defined at the right end of the cylinder 61, the piston 63 is forwardly moved to move, through the draw bar 49, the collet chuck 49 forwardly. The collet chuck 49 is moved to a position inside the sleeve 53, where the inner diameter of the sleeve is enlarged, so that the collet chuck 49 is disengaged from the pull stud 47 to unclamp the tool holder 15.

The front bearings 9 are lubricated by an oil-air lubricant supplied by an oil-air nozzle 69. The oil-air lubricant is supplied through an oil-air supply port 71 defined in the rear housing 25 and passes through an oil-air passageway defined in the rear and front housings 25 and 23 to the oil-air nozzle 69. The rear bearings 11 are lubricated by an oil-air lubricant supplied by a nozzle defined at the lower end of a supply pipe 73. The oil-air lubricant passes through the oil-air passageway 75 into the top end of the supply pipe 73. The supply pipe 73 extends through the bearing case 33 and the outer race collar. The supply pipe can be upwardly removed by untightening screw bolts 79 on a mounting flange 77. In case that the bearings are lubricated by grease, the oil-air passage and supply pipe are not required.

A plurality of coolant nozzles 81 are disposed at the front end face of the spindle head 5 for directing a coolant to the machining area. The coolant is supplied to the coolant nozzle 81 through a coolant supply port 83, defined in the rear housing 25, and a coolant passageway, extending in the front housing 23 and the bearing retainer 31.

An air passageway 85 opens to an intermediate portion of the tapered hole 13 for directing a compressed air for cleaning the tapered hole 13 at the time of tool change. The compressed air is directed to the tapered hole 13 through an air supply port 87, defined in the rear housing 25, and the air passageway extending in the rear housing 25, the front housing 23, the bearing retainer 31 and the spindle 7.

The front housing 23 defines a flange portion 89 and is detachably connected to the rear housing by screw bolts 27 through an insert joint 91. The front housing 23 is separated, along with the front bearings 9 and the spindle 7, from the rear housing 25 by untightening screw bolts 79, upwardly removing the supply pipe 73 and then untightening screw bolts 27. At this time, the rotor 42, the bearing case 33, accommodating the rear bearings 11, and the internal components of the spindle 7 including the tool holder 15, the collet chuck 14, the draw bar 51 and the Belleville springs 55, are coupled to the spindle 7. The components which can removed along with the front housing 23 is referred to as a front housing unit 93.

According to the invention, in case that the spindle 7, the front bearings 9 and/or the rear bearings 11 are replaced, whole of the front housing unit 93 is replaced. A method of replacing the front housing unit 93 will be described hereinafter.

A spindle replacing device 97 is composed of a slider 103 which moves along a rail 101 extending in Z-axis on a base plate 99 fastened to the pallet 21 and another slider 107 which moves along a rail 105 disposed on the slider 103 to extending in Z-axis. The slider 107 includes a vertical wall portion defining an opening for receiving the outer surface of the front housing 23. The front housing unit 93 is coupled to the spindle replacing device 97 by engaging four screw bolts into a threaded holes 109 define in the flange portion 89 of the front housing 23.

After the flange 89 is coupled to the slider 107, a pair of supporting blocks 113 are centrally urged by adjusting bolts 117 screwed in a brackets 117. The pair of supporting blocks form a V-shaped block for supporting the under side of the flange portion 89, and for positioning a new front housing when it is mounted for the replacement. The supporting blocks 113 are fastened to the vertical wall portion of the slider 107 by fastening setscrews 119.

When the front housing unit 93 is replaced at a site where the machine tool is used, the spindle replacing device 97 is mounted to the pallet 21. The pallet 21 is mounted to the table 19 by the pallet changer (step S1). In case of a machine tool which does not have a pallet changer, the spindle replacing device 97 is directly mounted to the table 19.

The screw bolts 79 are untightened from the rear side of the machine tool to remove the supply pipe 73. The spindle replacing device 97 and the spindle 7 are relatively positioned by X-, Y- and Z-axial feeding mechanisms. The slider 107 and the flange portion 89 of the front housing 23 are coupled by screw bolts 111 (step S2). The supporting blocks 113 are urged to the under side of the flange portion. The supporting blocks 113 are fastened to the slider 107 by fastening bolts 119. By untightening the screw bolts 27, the front housing 23 is disengaged from the rear housing 25 (step S3). By forwardly moving the slider 107, the front housing unit 93 is removed front the rear housing 25 (step S25). Sliders 103 and 107 are locked relative to the rails 101 and 105, respectively, by screw bolts (not shown). The pallet 21, to which the front housing unit 93 is mounted, is moved to a pallet loading station (not shown) by the pallet changer. The front housing unit 93 is detached from the spindle replacing device 97. Then, a new front housing unit for the replacement is mounted to the spindle replacing device 97 with the aid of the supporting blocks 113 (step 5).

The pallet 21, to which the new front housing unit is mounted, is mounted to the table 19. Then, the alignment of the new front housing unit is conducted by positioning the new front housing unit at the X-, Y- and Z-axial position of the previous front housing unit with the aid of a present position display unit. In order conduct the alignment more accurately, a displacement gage such as a micro indicator may be mounted to the rotating part of the new front housing unit, and urged against the inner diameter of the rear housing 25. Thus, the new front housing unit is inserted into the rear housing unit 25 (step S6). The new front housing of the front housing unit is coupled to the rear housing unit 25 by screw bolts 27 (step S7). Thus, the new front housing unit is coupled to rear housing by fitting the outer surface of the bearing case 33 into the inner surface of the hole 35 of the rear housing 25 and by fitting of the insert joint 91. Then, the supply pipe 73 is attached back again. The spindle replacing device 97 is detached from the front housing to remove it from the table 19. This terminates the spindle replacement operation.

According to the above-described embodiment, front housing unit 93 is manually removed from the rear housing by using the spindle replacing device 97 which has the sliders 103 and 107. However, the front housing unit 93 may be removed from the rear housing by Z-axis feeding mechanism with a device including the base plate 99 and a vertical wall member which corresponding to the vertical wall portion of the slider for mounting the flange portion 89 and fixedly connected to the base plate.

The invention can be applied to a spindle device of a vertical machining center. That is, a front housing unit can be removed from a rear housing by Z-axis feeding mechanism with the front housing of the vertical spindle device coupled to a spindle replacing device mounted to the table.

The present invention can be applied to a general purpose machine tool which includes a manually feeding mechanism as well as to an NC machine tool such as a machining center.

The invention claimed is:

1. A spindle device of a machine tool with a spindle which is rotationally supported by a housing, comprising:
   a spindle;
   a housing for enclosing a least a part of the spindle, the housing including a front housing and a rear housing which is detachably coupled to the front housing;
   a front bearing part, incorporated in the front housing, for rotationally supporting the front part of the spindle;
   a rear bearing part, incorporated in the rear housing, for rotationally supporting the rear part of the spindle; and
   the front bearing part, the spindle and the rear bearing part being removed as a whole from the rear housing along with the front housing when the front housing is removed from the rear housing.

2. A spindle device according to claim 1, further comprising: a stator of a built-in motor incorporated in the rear housing;
   a rotor of the built-in motor coupled to the spindle; and
   the front bearing part, the spindle, the rear bearing part and the rotor of the built-in motor being removed as a whole from the rear housing along with the front housing when the front housing is removed from the rear housing.

3. A machine tool which machines a workpiece by relatively moving a tool and the workpiece, comprising:
   a spindle device having a spindle which rotates and clamps a tool;
   a table to which the workpiece is mounted;
   moving mechanism for relatively moving the spindle device and the table;
   the spindle device comprising:
   a spindle;
   housing for enclosing a least a part of the spindle, the housing including a front housing and a rear housing which is detachably coupled to the front housing;
   a front bearing part, incorporated in the front housing, for rotationally supporting the front part of the spindle;
   a rear bearing part, incorporated in the rear housing, for rotationally supporting the rear part of the spindle; and
   the front bearing part, the spindle and the rear bearing part being removed as a whole from the rear housing along with the front housing when the front housing is removed from the rear housing.

4. A method of replacing a spindle of a machine tool which comprises a spindle device having a spindle, a housing for enclosing a least a part of the spindle, the housing including a front housing and a rear housing which is detachably coupled to the front housing, a front bearing part, incorporated in the front housing, for rotationally supporting the front part of the spindle and a rear bearing part, incorporated in the rear housing, for rotationally supporting the rear part of the spindle, the method comprising the steps of:
   mounting a spindle replacing device to a table of the machine tool;
   coupling the spindle replacing device and the front housing;
   removing a fastener member for fastening the front housing to the rear housing;
   moving the front housing away from the rear housing in the axial direction of the spindle to remove the front bearing part, the spindle and the rear bearing part, which are incorporated in the front housing, as a front housing unit from the rear housing;
   replacing the removed front housing unit with a new front housing unit;
   inserting the new front housing unit into the rear housing;
   coupling the new front housing and rear housing to each other by a fastener member; and
   removing the spindle replacing device from the front housing.

5. A method of replacing a spindle of a machine tool according to claim 4, wherein the step of replacing the removed front housing unit with a new front housing unit is conducted by a pallet changer of the machine tool.

6. A method of replacing a spindle of a machine tool according to claim 4, further comprising a step of aligning the spindle replacing device with the axis of the spindle by moving the table of the machine tool relative to the spindle.

7. A method of replacing a spindle of a machine tool according to claim 4, wherein the step of moving the front housing away from the rear housing in the axial direction of the spindle to remove the front bearing part, the spindle and the rear bearing part, which are incorporated in the front housing, as a front housing unit from the rear housing is conducted by moving the table in a direction parallel to the axis of the spindle.

* * * * *

(12) EX PARTE REEXAMINATION CERTIFICATE (6668th)
United States Patent
Kikkawa et al.

(10) Number: US 7,165,302 C1
(45) Certificate Issued: Feb. 17, 2009

(54) SPINDLE DEVICE OF MACHINE TOOL AND METHOD OF REPLACING SPINDLE

(75) Inventors: Yasuhiko Kikkawa, Minamitsuru-gun (JP); Akihiro Mochizuki, Minamitsuru-gun (JP)

(73) Assignee: Makino Milling Machines Co., Ltd., Meguro-Ku, Tokyo (JP)

Reexamination Request:
No. 90/008,705, Jun. 14, 2007

Reexamination Certificate for:
Patent No.: 7,165,302
Issued: Jan. 23, 2007
Appl. No.: 10/470,089
Filed: Jul. 23, 2003

(22) PCT Filed: Sep. 2, 2002

(86) PCT No.: PCT/JP02/08889

§ 371 (c)(1), (2), (4) Date: Jul. 23, 2003

(87) PCT Pub. No.: WO03/045622

PCT Pub. Date: Jun. 5, 2003

(30) Foreign Application Priority Data

Dec. 26, 2001 (JP) ........................... 2001-360027

(51) Int. Cl.
*B23B 19/02* (2006.01)

(52) U.S. Cl. ........................ 29/426.1; 29/469; 29/428; 409/230; 409/231; 82/147

(58) Field of Classification Search ........................ None
See application file for complete search history.

(56) References Cited

U.S. PATENT DOCUMENTS 3,552,264 A * 1/1971 Meinke ..................... 409/212

FOREIGN PATENT DOCUMENTS

| DE | 4122545 A1 * | 1/1993 |
| DE | 195 32 976 | 3/1997 |
| GB | 2 348 385 | 10/2000 |
| JP | 2530364 | 12/1996 |

OTHER PUBLICATIONS

"Assembly Instructions 1FE1 Synchronous built-in Motors", Siemens AG, 1999.*

* cited by examiner

*Primary Examiner*—Catherine S. Williams

(57) ABSTRACT

A spindle device of a machine tool such as a milling machine and a machining center and a method of replacing a spindle, the spindle device wherein the housing of a spindle head (5) is divided into a front housing (23) and a rear housing (25), a spindle (7) is installed in the front housing (23) through front bearings (9), and a built-in motor rotor (43), a bearing case (33) through rear bearings (11), and a draw bar (51) for clamping a tool are installed on and in the spindle (7) to form a front housing unit (93); the method comprising the step of replacing the spindle (7) and the bearings by replacing the front housing unit (93), whereby, when the spindle device comes out of order, the spindle and bearings can be easily replaced in a short time and the stop time of the machine tool can be minimized at a site where the machine tool is used.

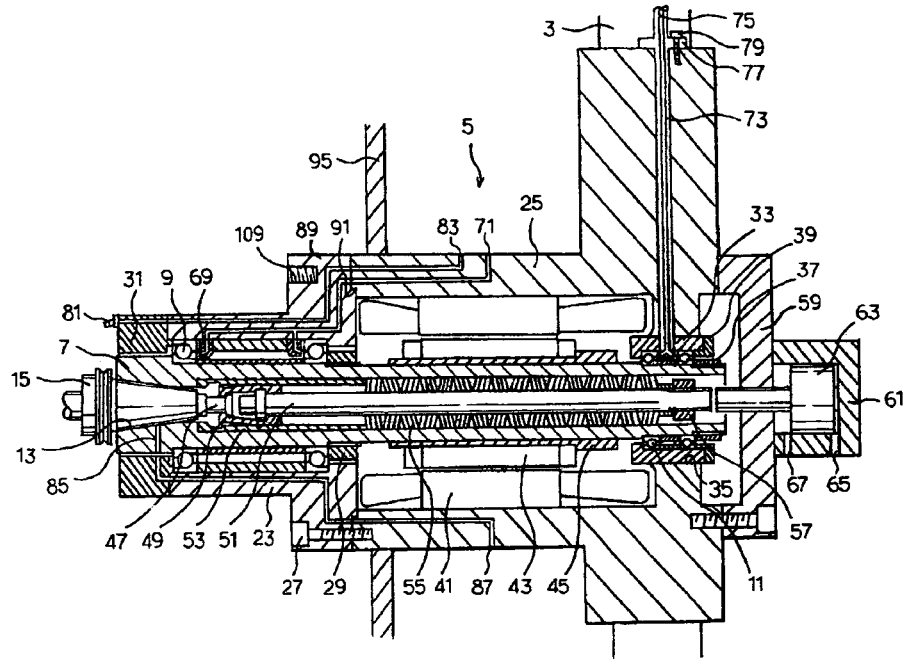

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 3 are determined to be patentable as amended.

Claims 4–6 and 7 were not reexamined.

1. A spindle device of a machine tool with a spindle which is rotationally supported by a housing, comprising:
    a spindle;
    a housing for enclosing a least a part of the spindle, the housing including a front housing and a rear housing which is detachably coupled to the front housing;
    a front bearing part, incorporated in the front housing, for rotationally supporting the front part of the spindle;
    *a bearing case accommodating* a rear bearing part, *including an inner race and an outer race*, incorporated in the rear housing *by fitting the bearing case into the rear housing*, for rotationally supporting the rear part of the spindle; and
    the front bearing part, the spindle and *the bearing case accommodating* the rear bearing part *including the inner race and the outer race* being removed as a whole from the rear housing along with the front housing when the front housing is removed from the rear housing.

2. A spindle device according to claim 1, further comprising: a stator of a built-in motor incorporated in the rear housing;
    a rotor of the built-in motor coupled to the spindle; and
    the front bearing part, the spindle, *the bearing case accommodating* the rear bearing part *including the inner race and the outer race* and the rotor of the built-in motor being removed as a whole from the rear housing along with the front housing when the front housing is removed from the rear housing.

3. A machine tool which machines a workpiece by relatively moving a tool and the workpiece, comprising:
    a spindle device having a spindle which rotated and clamps a tool;
    a table to which the workpiece is mounted;
    moving mechanism for relatively moving the spindle device and the table; the spindle device comprising:
    a spindle;
    housing for enclosing a least a part of the spindle, the housing including a front housing and a rear housing which is detachably coupled to the front housing;
    a front bearing part, incorporated in the front housing, for rotationally supporting the front part of the spindle;
    *a bearing case accommodating* a rear bearing part, *including the inner race and the outer race*, incorporated in the rear housing *by fitting the bearing case into the rear housing*, for rotationally supporting the rear part of the spindle; and
    the front bearing part, the spindle and *the bearing case accommodating* the rear bearing part *including the inner race and the outer race* being removed as a whole from the rear housing along with the front housing when the front housing is removed from the rear housing.

\* \* \* \* \*